(12) United States Patent
Swaminathan et al.

(10) Patent No.: US 10,335,856 B2
(45) Date of Patent: Jul. 2, 2019

(54) SYSTEM FOR TEMPERATURE CONTROLLED ADDITIVE MANUFACTURING

(71) Applicant: Applied Materials, Inc., Santa Clara, CA (US)

(72) Inventors: Bharath Swaminathan, San Jose, CA (US); Eric Ng, Mountain View, CA (US); Nag B. Patibandla, Pleasanton, CA (US); Hou T. Ng, Campbell, CA (US); Ashavani Kumar, Sunnyvale, CA (US); Ajey M. Joshi, San Jose, CA (US); Bernard Frey, Livermore, CA (US); Kasiraman Krishnan, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 18 days.

(21) Appl. No.: 15/195,298

(22) Filed: Jun. 28, 2016

(65) Prior Publication Data

US 2016/0375491 A1    Dec. 29, 2016

Related U.S. Application Data

(60) Provisional application No. 62/186,245, filed on Jun. 29, 2015.

(51) Int. Cl.
| | | |
|---|---|---|
| *B22F 3/10* | (2006.01) | |
| *B22F 3/105* | (2006.01) | |
| *B33Y 30/00* | (2015.01) | |
| *B29C 64/20* | (2017.01) | |
| *B28B 1/00* | (2006.01) | |
| *B33Y 10/00* | (2015.01) | |
| *B33Y 50/02* | (2015.01) | |

(52) U.S. Cl.
CPC ............ *B22F 3/1055* (2013.01); *B29C 64/20* (2017.08); *B33Y 30/00* (2014.12); *B22F 2003/1056* (2013.01); *B28B 1/001* (2013.01); *B33Y 10/00* (2014.12); *B33Y 50/02* (2014.12); *Y02P 10/295* (2015.11)

(58) Field of Classification Search
CPC .......... B22F 3/10; B22F 3/1055; B33Y 30/00; B29C 64/20
USPC ........................................................... 419/53
See application file for complete search history.

(56) References Cited

U.S. PATENT DOCUMENTS

| | | |
|---|---|---|
| 6,786,997 B1 | 9/2004 | Yamazaki |
| 7,261,542 B2 | 8/2007 | Hickerson et al. |
| 8,287,794 B2 | 10/2012 | Pax et al. |
| 2006/0054039 A1 | 3/2006 | Kritchman et al. |
| 2006/0272772 A1 | 12/2006 | Al-Bayati |
| 2012/0222618 A1 | 9/2012 | Olsen |
| 2012/0251688 A1 | 10/2012 | Zimmerman et al. |
| 2013/0073073 A1 | 3/2013 | Pettis |
| 2014/0145604 A1 | 5/2014 | Goscha |
| 2014/0220710 A1 | 8/2014 | Aderhold et al. |
| 2015/0034133 A1 | 2/2015 | Kim |
| 2015/0165524 A1 | 6/2015 | Ljungblad et al. |

FOREIGN PATENT DOCUMENTS

| | | |
|---|---|---|
| CN | 1926470 | 3/2007 |
| KR | 2004-0080593 | 9/2004 |
| KR | 100862842 | 10/2008 |
| KR | 2006-0114151 | 11/2016 |
| WO | WO 1998/056566 | 12/1998 |
| WO | WO 2015-031758 | 3/2015 |

OTHER PUBLICATIONS

International Search Report and Written Opinion in International Application No. PCT/US2016/039820, dated Oct. 14, 2016, 12 pages.
International Search Report and Written Opinion in International Application No. PCT/US2016/039834, dated Oct. 11, 2016, 7 pages.
Office Action in Chinese Application No. 201680039118.2, dated Dec. 26, 2018, 13 pages (with English translation).

*Primary Examiner* — Edward M Johnson
(74) *Attorney, Agent, or Firm* — Fish & Richardson P.C.

(57) ABSTRACT

An additive manufacturing system includes a platen having a top surface to support an object being manufactured, a dispenser to deliver a plurality of successive layers of precursor material over the platen, a plurality of lamps disposed below the top surface of the platen to heat the platen, and an energy source to fuse at least some of the outermost layer of precursor material.

14 Claims, 5 Drawing Sheets

SYSTEM FOR TEMPERATURE CONTROLLED ADDITIVE MANUFACTURING

CROSS-REFERENCE TO RELATED APPLICATIONS

This application claims priority to U.S. Provisional Application Ser. No. 62/186,245, filed on Jun. 29, 2015, the entire contents of which are incorporated by reference.

TECHNICAL FIELD

This invention relates to additive manufacturing, also referred to as 3D printing.

BACKGROUND

Additive manufacturing (AM), also known as solid freeform fabrication or 3D printing, refers to any manufacturing process where three-dimensional objects are built up from raw material (generally powders, liquids, suspensions, or molten solids) in a series of two-dimensional layers or cross-sections. In contrast, traditional machining techniques involve subtractive processes and produce objects that are cut out of a stock material such as a block of wood, plastic or metal.

A variety of additive processes can be used in additive manufacturing. The various processes differ in the way layers are deposited to create the finished objects and in the materials that are compatible for use in each process. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g. stereolithography (SLA).

Sintering is a process of fusing small grains, e.g., powders, to create objects. Sintering usually involves heating a powder. When a powdered material is heated to a sufficient temperature in a sintering process, the atoms in the powder particles diffuse across the boundaries of the particles, fusing the particles together to form a solid piece. In contrast to melting, the powder used in sintering need not reach a liquid phase.

Both sintering and melting can be used in additive manufacturing. The material being used determines which process occurs. An amorphous solid, such as acrylonitrile butadiene styrene (ABS), is actually a supercooled viscous liquid, and does not actually melt; as melting involves a phase transition from a solid to a liquid state. Thus, selective laser sintering (SLS) is the relevant process for ABS, while selective laser melting (SLM) is used for crystalline and semi-crystalline materials such as nylon and metals, which have a discrete melting/freezing temperature and undergo melting during the SLM process.

Conventional systems that use a laser beam as the energy source for sintering or melting a powdered material typically direct the laser beam on a selected point in a layer of the powdered material and selectively raster scan the laser beam to locations across the layer. Once all the selected locations on the first layer are sintered or melted, a new layer of powdered material is deposited on top of the completed layer and the process is repeated layer by layer until the desired object is produced.

An electron beam can also be used as the energy source to cause sintering or melting in a material. Once again, the electron beam is raster scanned across the layer to complete the processing of a particular layer.

SUMMARY

In one aspect, an additive manufacturing system includes a platen having a top surface to support an object being manufactured, a dispenser to deliver a plurality of successive layers of precursor material over the platen, a plurality of lamps disposed below the top surface of the platen to heat the platen, and an energy source to fuse at least some of the outermost layer of precursor material.

Implementations may include one or more of the following features. The plurality of successive layers may include a bottom layer deposited on a support and remaining layers each deposited on an underlying layer of fused powder. The support may be a top of the platen.

The energy source may be configured to direct energy to the outermost layer of powder from a side of the outermost layer farther from the platen. The energy source may include a lamp array configured to fuse substantially all of an outermost layer of powder. The energy source may include a laser configured to generate a laser beam to scan an outermost layer of powder.

The dispenser may include a nozzle configured to eject the powder and movable parallel to a top surface of the support. The dispenser may include a powder reservoir positioned adjacent the platen and a laterally movable roller to push a portion of powder out of the reservoir and across the platen.

A power source may supply power the plurality of lamps, and power to at least some of the plurality of lamps may be independently controllable. The plurality of lamps may be arranged in a plurality of radial zones, and wherein power to each radial zone may be independently controllable.

A Faraday cage may enclose the plurality of lamps. The Faraday cage may include a conductive mesh configured such that light from the plurality lamps passes through the conductive mesh to radiatively heat the platen. The plurality of lamps may be arranged in a plurality of radial zones and the Faraday cage may isolate each radial zone. The platen may include a conductive plate, and the system may include a radio frequency (RF) power source to apply RF power to the conductive plate. The platen may be vertically movable and is supported by a piston rod, and the system comprises a linear actuator to move the platen vertically. An RF pin may extend through the piston rod to carry power from the RF power source to the conductive plate. A dielectric insert may insulate the RF pin from the Faraday cage. The platen may include a dielectric plate positioned between the plurality of lamps and the conductive plate. A dielectric layer may coat the top surface of the conductive plate. The platen may include a dielectric ring laterally surrounding the conductive plate. A vacuum chamber may enclose the platen, a gas source may be configured to supply a gas to the chamber, and the RF power source may be configured to apply an RF voltage to the conductive plate to generate a plasma in the chamber.

In another aspect, a method of additive manufacturing includes dispensing a plurality of successive layers of precursor material over a support, heating the support using a plurality of lamps disposed below the support, and applying energy to an outermost layer from an energy source positioned above the support to fuse at least a portion of the outermost layer.

Implementations may include one or more of the following features. Power applied to at least some of the plurality of lamps may be independently controlled. The plurality of lamps may be arranged in a plurality of radial zones, and comprising independently controlling power applied to each radial zone may be independently controlled.

The plurality of lamps may be isolated from a region above the support with faraday cage. Heating the support may include directing light through a conductive mesh of the faraday cage. A plasma may be generated in a region above the support.

Advantages can include one or more of the following. A lamp array can be used to raise the temperature of the feed material to a base temperature that is below the melting or sintering point of the base temperature. Less energy is required by the energy source to selectively raise the feed material to a temperature to fuse the feed material. In general, because less energy is required, the feed material can be raised to the transition temperature more quickly. For example, where the energy source is a scanning beam, the scanning beam can move more quickly across the layer of feed material. Therefore, the throughput of the additive manufacturing system can be increased.

The heat applied to different regions of the layer of feed material can be independently controlled. This permits improved uniformity of the base temperature across the layer of feed material. This can improved reliability that particular voxel will be fused in accordance with the desired shape of the object being fabricated, e.g., as represented in a CAD file. Consequently, yield or tolerance of the manufactured objects can be increased.

The lamp array can also be used to selectively heat desired portions of the layer of feed material deposited on the platen, so that only desired portions of the feed material are fused.

The lamp array can be protected from the RF radiation that may exist during the additive manufacturing process. Conversely, the chamber can be protected from RF radiation from power applied to the lamps. This may be achieved by placing the heating lamps in a faraday cage. The faraday cage protects the heating lamps from the RF radiation. This can prevent accidental powering of the lamps, which can improve reliability of independent control of the lamps. This can also prevent plasma generation in the lamp array space, which can prolonging the life of the heating lamps. Similarly, the faraday cage protects the chamber from RF leakage from the power applied to the lamps, thus improving reliability of any plasma processing.

The details of one or more embodiments are set forth in the accompanying drawings and the description below. Other aspects, features and advantages will be apparent from the description and drawings, and from the claims.

DESCRIPTION OF DRAWINGS

Like reference symbols in the various drawings indicate like elements.

DETAILED DESCRIPTION

Additive manufacturing usually involves depositing a layer of feed material (for example, powders, liquids, suspensions, molten solids) on a platen, followed by a method to fuse portions of the layer of feed material. Fusing the desired portions of the layer of feed material can be achieved by supplying energy from one or more energy sources. The energy source, for example, can be a laser and/or arrays of heat lamps. The arrays of heat lamps can be located above or below the platen or elsewhere in the chamber of the additive manufacturing apparatus. Energy from the energy source heats up the feed material and causes it to fuse together to form a solid piece. Sometimes, it is desirable that the temperature of the feed material deposited on the platen is controlled to remain at a uniform temperature. This can be achieved by a lamp array located below the platen. The individual lamps within the lamp array can be independently controlled.

The techniques of using an array of heat lamps can be applied to both additive manufacturing and semiconductor processing, and therefore both techniques are described below.

Figure 1A:
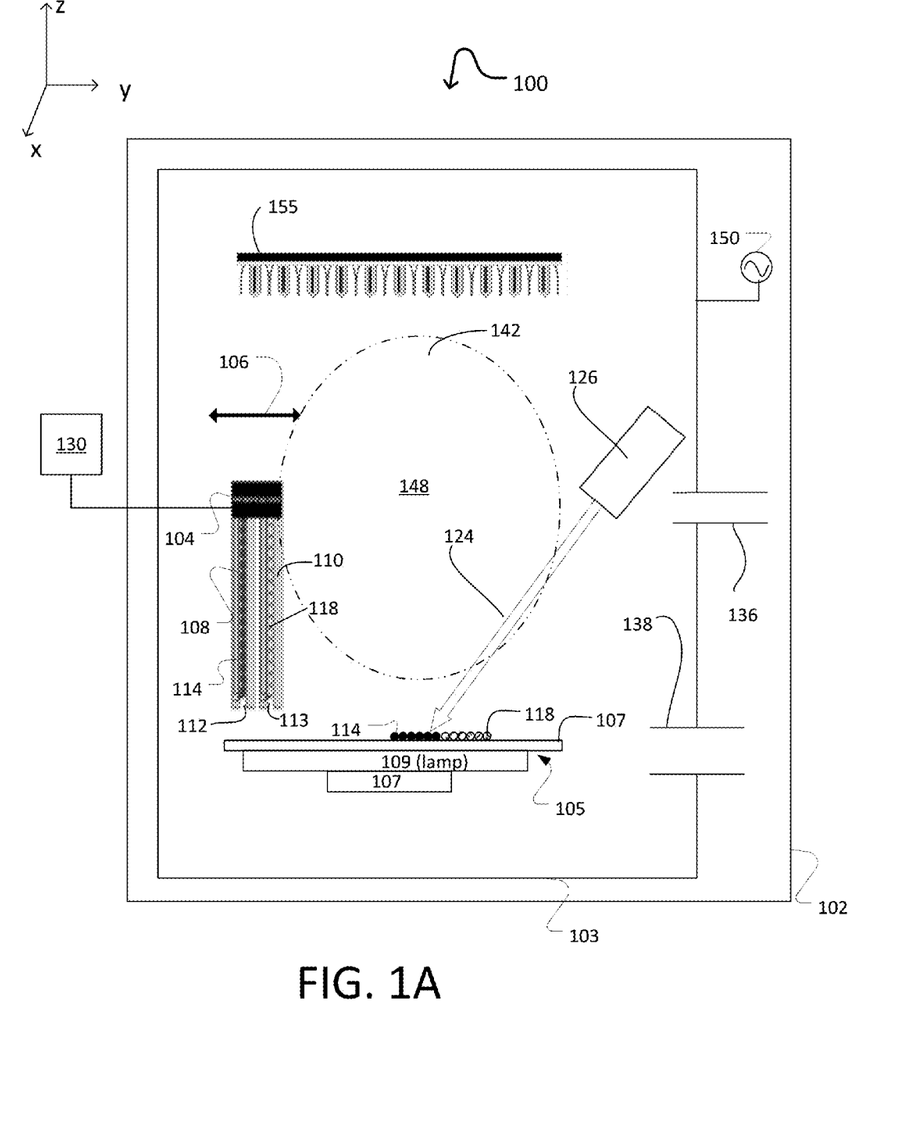
FIG. 1A is a schematic side view of an additive manufacturing system.

FIG. 1A shows a schematic of an exemplary additive manufacturing system 100. The system 100 includes and is enclosed by a housing 102. The housing 102 can, for example, allow a vacuum environment to be maintained in a chamber 103 inside the housing, e.g., pressures at about 1 Torr or below. Alternatively the interior of the chamber 103 can be a substantially pure gas, e.g., a gas that has been filtered to remove particulates, or the chamber can be vented to atmosphere. The gas can enter the chamber 103, from a gas source (not shown), through a gas inlet 136. The gas from the chamber can be removed through a vacuum vent 138.

The vacuum environment or the filtered gas can reduce defects during manufacture of a part. In addition, by using reactive chemistry in a vacuum environment, it is possible to reduce oxide layers on metal powder particles, thus reducing sintering temperatures. This can increase throughput and/or part quality. In addition, a vacuum environment can aid in the generation of a plasma. The vacuum environment can also be a factor in controlling thermally the sintered block, by eliminating convective heat losses when compared to traditional purged environments.

The additive manufacturing system 100 includes feed material delivery system to deliver a layer of feed material, e.g., a powder, over a platen 105, e.g., on the platen or onto an underlying layer on the platen. The platen 105 can be sufficiently large to accommodate fabrication of large-scale industrial parts. For example, the platen 105 can be at least 500 mm across, e.g., 500 mm by 500 mm square. For example, the platen can be at least 1 meter across, e.g., 1 meter square.

The feed material delivery system can include a material dispenser assembly 104 positionable above the platen 105. A vertical position of the platen 105 can be controlled by a piston 107.

In some implementations, the dispenser 104 includes a plurality of openings through which one or more feed materials can be deposited on the platen. The dispenser can eject the feed material through an opening. For example, the dispenser 104 can delivers powder particles in a carrier fluid, e.g. a high vapor pressure carrier, to form the layers of powder material. The carrier fluid can evaporate prior to the fusing step for the layer. In some implementations, the plurality of openings extend across the width of the platen, e.g., in direction perpendicular to the direction of travel 106 of the dispenser 104. In this case, in operation, the dispenser 104 can scan across the platen 105 in a single sweep in the direction 106. Each opening can be independently controllable, so that the feed material can be delivered in a pattern specified by a CAD-compatible file.

Alternatively, e.g., where the plurality of openings do not extend across the width of the platen, the dispenser 104 can move in two directions to scan across the platen 105, e.g., a raster scan across the platen 105.

In the embodiment shown in FIG. 1A, feed materials 114 and 118 that are stored in reservoirs 108 and 110 respectively, can be deposited. The opening for each feed material can have an independently controllable gate, so that delivery of the feed material through each opening can be independently controlled. For example, release of the feed materials 114 and 118 is controlled by gates 112 and 113 respectively.

A controller 130 controls a drive system (not shown), e.g., a linear actuator, connected to the dispenser assembly 104. The drive system is configured such that, during operation, the dispenser assembly is movable back and forth parallel to the top surface of the platen 105 (along the direction indicated by arrow 106). For example, the dispenser assembly 104 can be supported on a rail that extends across the chamber 103. As the dispenser assembly 104 scans across the platen, the dispenser assembly 104 deposits feed material at an appropriate location on the platen 105 according to a printing pattern that can be stored as a computer aided design (CAD)-compatible file that is then read by a computer associated with the controller 130. Electronic control signals are sent to gates 112 and 113 to dispense the feed material when the dispenser is translated to a position specified by the CAD-compatible file.

Alternatively, in some implementations, the feed material delivery system can include a powder delivery bed adjacent the platen 105, and a device, e.g., a blade or a roller, to push powder from the delivery bed across the platen to form the layer of feed material.

The feed material can be deposited uniformly on the platen 105 and the power sources can be configured to heat locations specified by a printing pattern stored as a computer aided design (CAD)-compatible file to cause fusing of the powder at the locations.

For example, a laser beam 124 from a laser source 126 can be scanned across the platen 105, with laser power being controlled at each location to determine whether a particular voxel fuses or not. The laser beam 124 can also scan across locations specified by the CAD file to selectively fuse the feed material at those locations. To provide scanning of the laser beam 124 across the platen 105, the platen 105 can remain stationary while the laser beam 124 is horizontally displaced. Alternatively, the laser 124 can remain stationary while the platen 105 is horizontally displaced. An electron beam generated by an electron gun could be used instead of a laser beam. A drive system, e.g., a pair of linear actuators, can be coupled to the platen and/or the power source, e.g., laser source or electron gun, to provide the relative motion between the beam and the layer of material. Alternatively or in addition, the beam could be controllably deflected, e.g., by a mirror galvanometer for a laser beam or controlled voltage on a pair of electrode plates in the case of an electron beam.

As another example, the upper lamp array 155 can be a digitally addressable heat source in the form of an array of individually controllable light sources, e.g., a vertical-cavity surface-emitting laser (VCSEL) chips. The array of controllable light sources can be a linear array which is scanned across the substrate surface, or a full two-dimensional array, which selectively preheats areas according to which chip is addressed.

One or more power sources can supply heat to the layer of feed material deposited on the platen causing the feed material powder to fuse. For example, in FIG. 1A, the power sources that supply energy to the feed material include a lower lamp array 109, an upper lamp array 155, laser source 126 and plasma 148. When the temperature of the feed material becomes sufficiently high, it may sinter or melt. Sintering is a process of fusing small grains, e.g., powders, to creating objects from smaller grains, e.g., powders using atomic diffusion. On the other hand, melting involves a phase transition from a solid phase to a liquid phase. Both sintering and melting of the feed material can lead to fusion of the feed material. From here on, the phrase 'sintering' will be used to describe any process that leads to the fusing of the feed material.

If generation of a plasma is desired, a gas is supplied to the chamber 103 through a gas inlet 136. Applying radio frequency (RF) power to the chamber 103 from the RF power source 150 can lead to the generation of plasma 148 in the discharge space 142. The plasma generation system can includes an electrode, i.e., a first electrode, and a counter-electrode, i.e., a second electrode. The first electrode can be a conductive layer on or in the platen 105. The second electrode can be a plate suspended in the chamber 103, or the counter-electrode 312 could have other shapes or be provided by portions of the walls of the chamber 103. An electrode mesh can cover the underside of the upper lamp array 155 to shield the lamps from the RF power and/or provide the counter-electrode.

At least one of the electrode and/or counter-electrode is connected to an RF power supply 150, e.g., an RF voltage source. For example, the first electrode can be connected to a first RF power supply and the second electrode can be connected to a second RF power supply. In some implementations, one of the first or second electrodes is connected to an RF power supply and the other of the first and second electrodes is grounded or connected to an impedance matching network.

By application of an RF signal of appropriate power and frequency, a plasma 148 forms in a discharge space between the electrode and the counter-electrode. The plasma 148 is depicted as an ellipse only for illustrative purposes. In general, the plasma fills the region between platen 105 and a counter electrode, which can be a portion of the chamber walls or a separate electrode in the chamber 103. The amplitude of the RF, generated from the RF power source 150, can be used to control the flux of ions in the plasma. The frequency of the RF, generated from the RF power source 150, can be used to control the energy of ions in the plasma.

Alternatively or in addition to the electrodes discussed above, a coil can be used to generate and/or confine the plasma. For example, a coil can be wound about the exterior surface of a dielectric (e.g., quartz) portion of the walls of the vacuum chamber 103. An RF voltage is applied to the coils by the RF power source 150;

The platen 105 can be moved by the piston 107 to a different vertical position to change the spacing between the high potential and ground. ADC bias voltage can be applied to the first or second electrode to accelerate electrons and/or ions into the layer. A remote plasma source could be used, and ions could be injected into the chamber 103.

Operating the system 100 under a vacuum environment may provide quality control for the material formed from processes occurring in the system 100. Nonetheless, for some systems the plasma 148 can also be produced under atmospheric pressure.

The temperature of the feed material, deposited on the platen 105, can be raised by supplying energy to it from one or more power sources such as the upper lamp array 155, lower lamp array 109, laser source 126 and plasma 148. One or a combination of power sources in the additive manufacturing system can heat the entire or a portion of the layer of one or more feed materials (for example materials 114 and 118) deposited on the platen 105 to a base temperature that is below the sintering temperature. Then, desired portions of the layer of feed materials can be heated above the sintering temperature by a different power source or a combination of power sources.

For example, the lower lamp array 109 can heat the layer of feed material deposited on the platen to a base temperature, and the upper lamp array 155 and the laser source 126, either singly or in combination, can be used to selectively sinter desired portions of the layer of feed material. Alternatively, the upper lamp array 155 and the lower lamp array 109 can heat the feed material deposited on the platen to the base temperature, and the laser source 126 can selectively sinter desired portions of the layer of feed material.

Where a single feed material is used, a spatially controlled pattern can be generated by selective dispensing by the dispenser 104 or by selective application of heat to the layer of powder, e.g., by scanning with the laser beam 124. Where multiple kinds of feed material are used, the two materials can have different sintering temperatures, so that application of heat across the entire platen simultaneously, e.g., by upper lamp array 155, brings only the first material above the sintering temperature.

Using a combination of power sources to heat the feed material deposited on platen 105, can lead to a better temperature control of the feed material and therefore improved reliability of the sintering of the feed material. Improvement in the control of feed material temperature can also improve the accuracy with which the printing pattern stored as a computer aided design (CAD)-compatible file is sintered. Using multiple power sources can also reduce the processing time for the additive manufacturing process. For example, the upper lamp array 155 can heat the layer of feed material, dispensed on the platen 105, to a base temperature. The laser beam 124 from laser source 126 and/or the upper lamp array 155 can be configured to provide a smaller temperature increase to sinter the desired portions of the layer of deposited feed material. Transitioning through a small temperature difference can enable the feed material to be processed more quickly. For example, the base temperature of the feed material on the platen 105 can be about 1500° C. and the beam 124 and/or the upper lamp array 109 can cause a temperature increase of about 50° C. Alternatively, both the upper lamp array 155 and the lower lamp array 109 can be used to maintain the base temperature of the layer of deposited feed material, and the laser beam 124 provides the small temperature increase required for sintering.

Whichever power source is used to establish the base temperature can apply heat before the energy source that is used to fuse the feed material is activated. For example, the power source used to establish the base temperature, e.g., the lower lamp array, can remain on between dispensing of successive layers. This can establish the platen 105 at a selected temperature without requiring that the entire platen 105 be heated for each layer, thus reducing energy consumption.

The power sources, for example, the laser source 126, the upper lamp array 155 and/or the platen 105 can be coupled to an actuator assembly, e.g., a pair of linear actuators configured to provide motion in perpendicular directions, so as to provide relative motion between the beam 124 and the platen 105. The controller 130 can be connected to the actuator assembly to cause the beam 124 and plasma 148 to be scanned across the layer of feed material.

The feed material can be dry powders of metallic or ceramic particles, metallic or ceramic powders in liquid suspension, or a slurry suspension of a material. For example, for a dispenser that uses a piezoelectric printhead, the feed material would typically be particles in a liquid suspension. For example, the dispenser 104 can deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals. Examples of ceramic materials include metal oxides, such as ceria, alumina, or silica, aluminum nitride, silicon nitride, silicon carbide, or a combination of these materials.

Optionally, the system 100 can include a compaction and/or levelling mechanism to compact and/or smooth the layer of feed materials deposited over the platen 105. For example, the system can include a roller or blade that is movable parallel to the platen surface by a drive system, e.g., a linear actuator. The height of the roller or blade relative to the platen 120 is set to compact and/or smooth the outermost layer of feed material. The roller can rotate as it translates across the platen.

In operation, after each layer has been deposited and heat treated, the platen 105 is lowered by an amount substantially equal to the thickness of layer. Then the feed material delivery system deposits a new layer of feed material that overlays the previously deposited layer. For example, the dispenser 104, which does not need to be translated in the vertical direction, scans horizontally across the platen to deposit the new layer. The new layer can then be heat treated to fuse the feed material. This process can be repeated until the full 3-dimensional object is fabricated. The fused feed material derived by heat treatment of the feed material provides the additively manufactured object.

The use of plasma allows characteristics of the fused feed material to be easily controlled. For example, the layer of feed material can be doped by selectively implanting ions from the plasma. The doping concentration can be varied layer by layer. The implantation of ions can help release or induce point stress in the layer of feed material. Examples of dopants include phosphorous.

For some processes, compaction of the feed material before sintering can improve the quality of the part generated by the additive manufacturing process. For example, compaction can provide a higher density part. The compaction of the feed material can be achieved, for example, by applying mechanical or electrostatic pressure on the feed material.

Figure 1B:
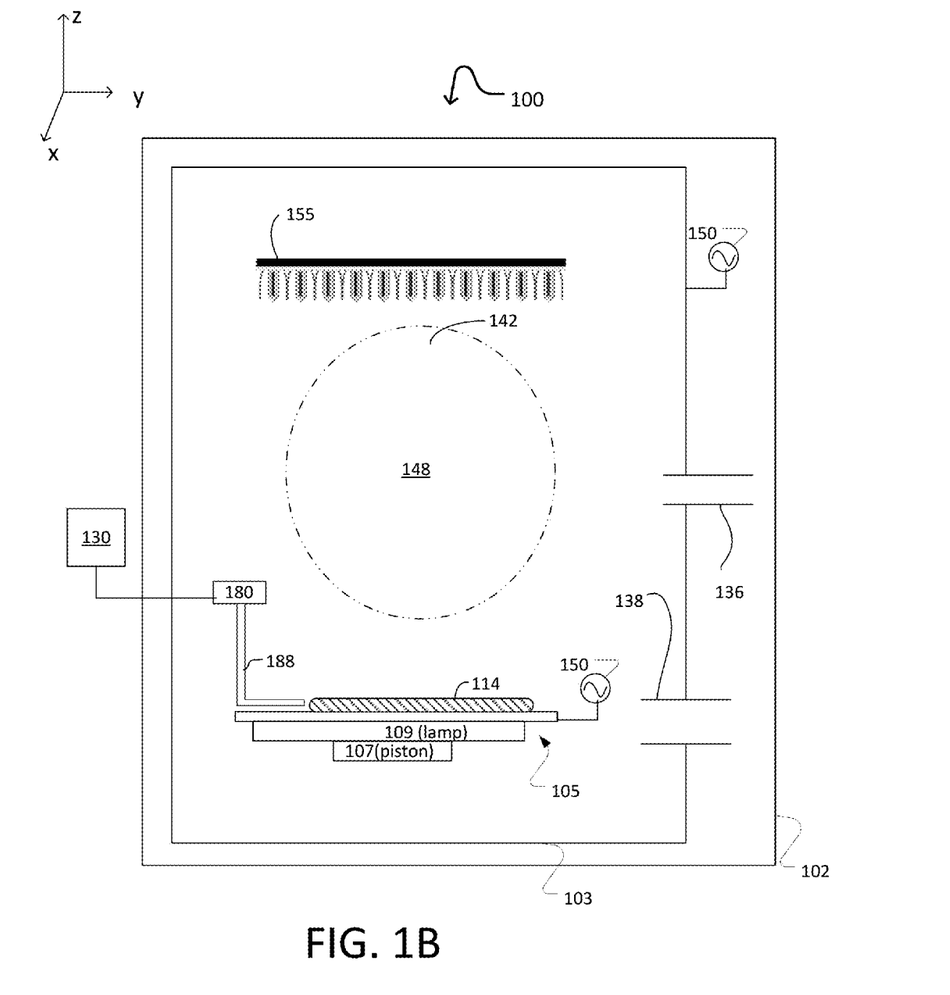
FIG. 1B is a schematic side view of a semiconductor processing apparatus.

The lower lamp array described for the additive manufacturing systems, can also be used semiconductor device fabrication tools. FIG. 1B illustrates an implementation of a system for the fabrication of semiconductor devices. The embodiment in FIG. 1B is similar to the additive manufacturing system described in FIG. 1A. However, the dispenser 104 is replaced by robot 180 having an end effector 188 that can move a wafer 114, for example, it can move the wafer 114 onto the platen 105 for fabrication or away from the platen 105 after fabrication. The robot 180 is controlled by a controller 130. The controller 130 can also control the flow of the gas through the gas inlet 136 and actuation of the piston 107. Plasma can be generated inside the housing 103 in a manner similar to that described for the embodiment in FIG. 1A. One or more power sources can supply energy to the semiconductor wafer 114. For example, in FIG. 1B, the power sources that supply energy for the fabrication of the wafer 114 are a lower lamp array 109, an upper lamp array 155, and plasma 148.

One or a combination of power sources can heat the entire or a portion of the wafer 114 to a base temperature. Then, desired portions of the wafer 114 can be heated above a processing temperature by a different power source or a combination of power sources, and/or plasma processing can be performed on the wafer 114. For example, the lower lamp array 109 can heat the wafer 114 to a base temperature. Then plasma 148 can be used for a plasma processing step, e.g., plasma-assisted chemical vapor deposition, or plasma etching. In addition or alternatively, the upper lamp array 155 and/or plasma 148 can be used to raise the temperature of the wafer to a processing temperature.

Figure 2:
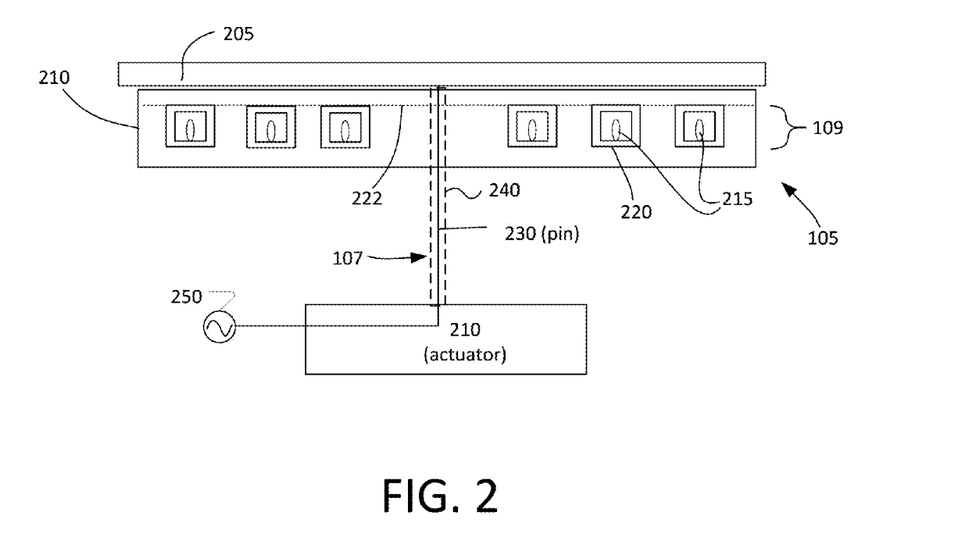
FIG. 2 is a schematic side view of a platen.

Referring to FIG. 2, a platen 105 includes a conductive plate 205, and a lamp housing 210 that is positioned below the conductive plate 205 and that includes the lower lamp array 109. A thin layer of dielectric material, e.g., alumina, can cover the top surface of the conductive plate 205.

The lower lamp array 109 comprises individual heating elements, for example, heating lamps 215. The heating lamps 215 can be halogen lamps, quartz lamps or xenon lamps. A support 107, e.g., a piston rod, can hold the platen 105 in the chamber.

The heating lamps 215 can be surrounded by a faraday cage 220 that prevents RF radiation/fields (RF may be considered to include microwave frequencies) from reaching or escaping the heating lamps 215. The faraday cage 220 is usually made of sheets or meshes of conductive material. FIG. 2 illustrates a single faraday cage for lamp, but alternatively a single faraday cage could surround all the lamps, or there could be multiple faraday cages surrounding different subsets of the lamps.

The faraday cage 220 can include a conductive mesh 222 positioned over the lamps. The mesh 222 permits light from the lamps 215 to reach and heat the conductive plate 205, while preventing RF radiation from reaching the lamp 215. The material and dimension of the mesh can be selected based on the RF frequency and temperature requirements.

Without being limited to any particular theory, when an RF field/radiation impinges on the surface of the faraday cage 220, the charge carriers (usually electrons) in the faraday cage 220 rearrange themselves and prevent RF electromagnetic field from crossing through the faraday cage 220. The heating lamps 215 can be damaged by the electromagnetic field or radiation that may be generated during the additive manufacturing process. The faraday cage 220 can therefore protect the heating lamps 215 from the RF radiation/fields that can originate, for example, from the RF source 250.

The platen 105 can be displaced in an up or down direction by an actuation system. For example, an actuator 210 can displace the platen 105 in the z direction during the additive manufacturing process.

An electrically conductive pin 230 may extend through or provide the rod 240 to connect the conductive plate 205 to an RF source 250. The RF source 250 may be connected to the conductive plate through a port other than the pin 230. Alternatively or in addition, an RF source 250 can be connected to some other part of the additive manufacturing system, for example, to the wall of the chamber 103 as shown in FIG. 1B. In some implementations, the RF source 250 is not connected to the conductive plate 205, but rather the conductive plate 205 is connected to ground or to an impedance matching network.

Figure 3:
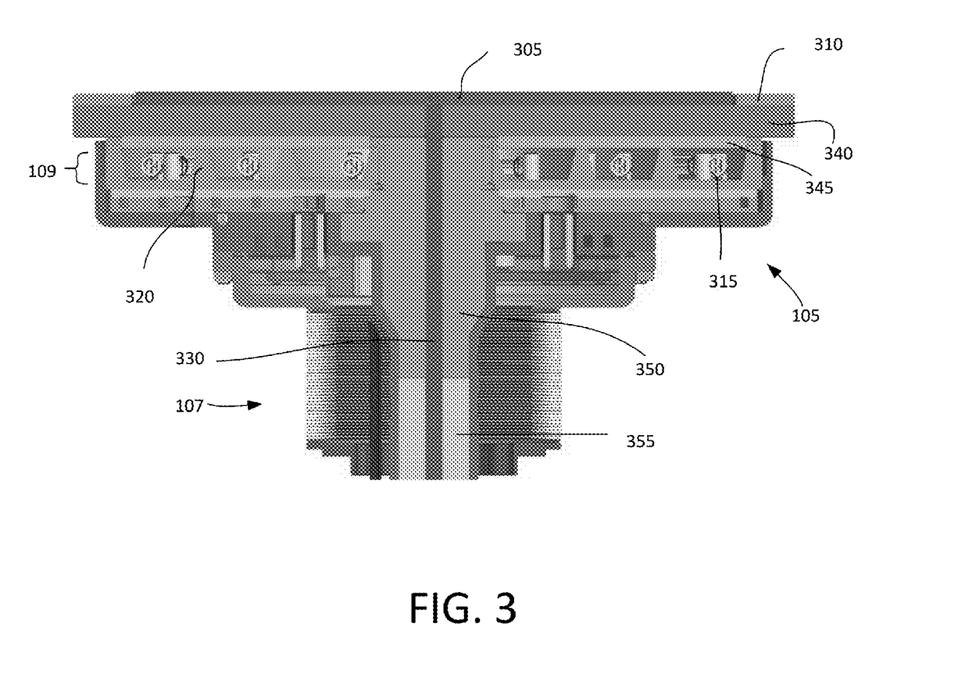
FIG. 3 is a schematic cross-sectional side view of a platen.

FIG. 3 illustrates an implementation of the platen 105 and the lower lamp array 109 of the additive manufacturing system of FIG. 1A or the semiconductor processing system of FIG. 1B. Similar to the embodiment in FIG. 2, the platen 105 includes a conductive plate 305 placed above the lower lamp array 109. The lower lamp array 109 comprises a plurality of lamps 315. The lamps 315 are surrounded by the faraday cage 320. The faraday cage 320 can be similar to the cage 220, and can include a conductive mesh 322 positioned over the lamps to permit light from the lamps 315 to reach and heat the conductive plate 305, while preventing RF radiation from reaching the lamps 315.

The lower lamp array can be electrically insulated from conductive plate 305 by insulators, for example dielectric layers 340 and 345 that are placed between the conductive plate 305 and the lower lamp array. Additionally, the dielectric layers 340, 345 can also act as a heat sink.

The conductive plate 305 can be surrounded by a dielectric ring. The dielectric ring 310 can be, for example, alumina. A thin layer of dielectric material, e.g., alumina, can cover the top surface of the conductive plate 305. This confines the conductive plate 305 on all sides to that it behaves like an embedded electrode.

The platen 105 can be connected by the support 107 to a vertical actuator (not shown) that and allows the platen 105 to move up and down in the z direction. A pin 330 can extend through the support 107 to connect the conductive plate 305 to an RF source (not shown). Alternatively, the RF source may be connected to the conductive plate 305 through another conductive port. The RF source sends an RF signal to the plate that can led to the generation of plasma during the additive manufacturing process. The pin 330 is surrounded by a dielectric filler 350 and 355, e.g., quartz blocks, that provide insulation between the pin 330 and the lower lamp array, and mechanical support to the pin 330 and the platen 305. Using multiple dielectric blocks can reduce the likelihood of thermally induced failure.

As described with reference to embodiments described in FIG. 1A and FIG. 1B, the lower lamp array 109 can be configured to controllably heat selected portions of the platen, and therefore heat selected portions of the deposited feed layer. The controllable heating of the platen by the lower lamp array can be achieved by selectively turning on or independently controlling power to the lamps 315 that lie below the corresponding portion of the plate 305.

Figure 4A:
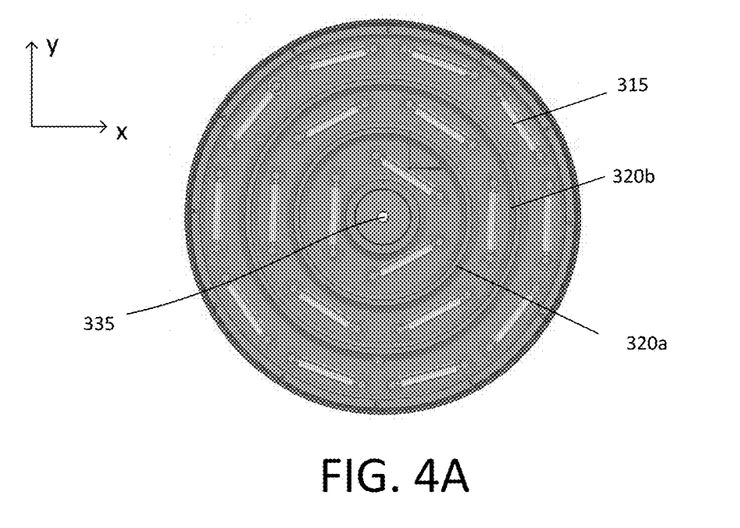
FIG. 4A is a schematic top view of the platen of FIG. 3.

FIG. 4A illustrates the top view (along the negative z direction) of the lower lamp array. The lamps 315 are arranged in concentric circles. The lamps of each concentric circle can be controlled independently of the lamps in the other circles. This provides a plurality of radial zones that are individually controllable. Since processing and heat loss is typically circularly symmetric, control by radial zone to achieve temperature uniformity across the platen is typically satisfactory and is computationally simpler.

The arrangement of the lamps in concentric circles in FIG. 4A is only shown as an example. The lamps could be arranged in other configurations, for example, in a honeycomb or checkered pattern, or concentric rectangular frames, e.g., for a rectangular processing chamber.

Figure 4B:
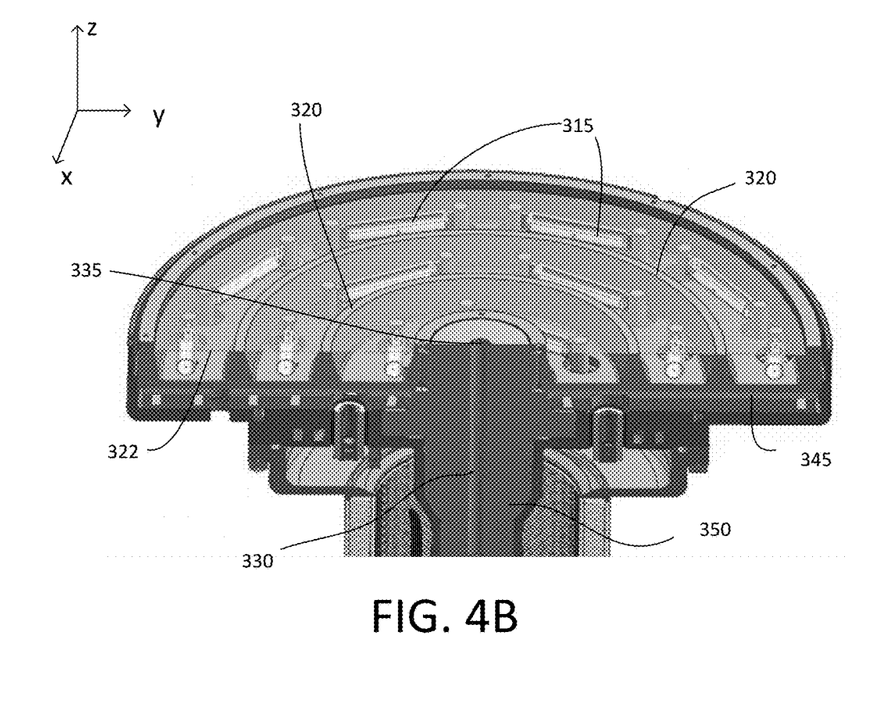
FIG. 4B is a schematic cross-sectional perspective view of the platen of FIG. 3.

FIG. 4B shows a side view of the lower lamp array described in FIG. 4A. A hole is provided in the lamp array to allow the pin that connects the actuator to the conductive plate. The pin 330 that passes through the opening 335 and connects the conductive plate (shown in FIG. 3) to either the actuator, the RF source or both. The pin 330 is surrounded by quartz 350 that acts as an insulator and provides mechanical support.

The different zones of lamps, e.g., the concentric circles, are separated from each other by one or many faraday cages 320*a* and 320*b*. Arranging the lamps in concentric circles can allow for the control of the temperature of the deposited feed material that is being sintered, especially when the additive manufacturing process is radially symmetric.

For some processes, as the sintering process moves radially outwards or inwards, the heat lamps, which lie in the concentric circle with radius substantially similar to the radius of sintering, are turned on. For example, when the feed material close to the opening 335 is being sintered by the laser source, the heat lamps that lie within the circle formed by the faraday cage 320*a* are turned on. As the sintering process moves radially outwards, the heat lamps that lie in concentric circles with larger radii, for example between the faraday cages 320*a* and 320*b* can be turned on.

For some processes, the lamps 315 remain on, but the power delivered to each zone is adjusted to maintain a substantially uniform base temperature across the platen 105, e.g., in the layer or wafer on the platen or in the conductive plate 305.

Referring to either FIG. 1A or 3A, the controller 140 of system 100 or 300 is connected to the various components of the system, e.g., actuators, valves, and voltage sources, to generate signals to those components and coordinate the operation and cause the system to carry out the various functional operations or sequence of steps described above. The controller can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

As noted above, the controller 140 can include non-transitory computer readable medium to store a data object, e.g., a computer aided design (CAD)-compatible file, that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 140, e.g., as controlled by firmware or software, can interpret the data object received from the computer to generate the set of signals necessary to control the components of the system to print the specified pattern for each layer.

The processing conditions for additive manufacturing of metals and ceramics are significantly different than those for plastics. For example, in general, metals and ceramics require significantly higher processing temperatures. For example, metals need to processed at temperature on the order of 400° C. or higher, e.g., 700° C. for aluminum. In addition, processing of metal should occur in vacuum environment, e.g., to prevent oxidation. Thus 3D printing techniques for plastic may not be applicable to metal or ceramic processing and equipment may not be equivalent. In addition, the fabrication conditions for large scale-industrial parts can be significantly more stringent.

However, some techniques described here could be applicable to plastic powders. Examples of plastic powders include nylon, acrylonitrile butadiene styrene (ABS), polyurethane, acrylate, epoxy, polyetherimide, polyetheretherketone (PEEK), polyetherketoneketone (PEKK), polystyrene or polyamides.

A number of implementations have been described. Nevertheless, it will be understood that various modifications may be made. For example, although the discussion above mentions multiple power sources, not all of these sources need be included. For example, the following are possibilities with respect to additive manufacturing:

The lower lamp array is used by itself as the energy source to raise the temperature of the feed material sufficiently to cause fusing of the feed material.

The lower lamp array is used to raise the temperature of the feed material to a base temperature, and one or more other energy sources, e.g., the upper lamp array, laser and/or plasma, are used to raise the temperature of the feed material to cause fusing. The power to the lamps is controlled in common.

The lower lamp array is used to raise the temperature of the feed material to a base temperature, and the power to lamps in different zones is independently controlled in order to provide improved temperature uniformity of the base temperature across the layer of feed material. One or more other energy sources, e.g., the upper lamp array, laser and/or plasma, are used to raise the temperature of the feed material to cause fusing.

The upper lamp array is used raise the temperature of the feed material partly to near the base temperature, and the power to the lamps in different zones of the lower lamp array is independently controlled in order to compensate for non-uniform heating, e.g., non-uniformity provided by the upper lamp array, to bring the layer of feed material to the base temperature with improved uniformity. One or more other energy sources, e.g., the laser and/or plasma, are used to raise the temperature of the feed material to cause fusing.

The object can be subject to thermal annealing as part of the sintering process.

A conductive mesh could be substituted for the conductive plate.

Accordingly, other implementations are within the scope of the following claims.

What is claimed is:

1. An additive manufacturing system, comprising:
a platen having a top surface to support an object being manufactured;
a dispenser to deliver a plurality of successive layers of precursor material over the platen;
a plurality of lamps disposed below the top surface of the platen to heat the platen; and
an energy source to fuse at least some of the outermost layer of precursor material.

2. The system of claim 1, wherein the energy source is configured to direct energy to the outermost layer of precursor material from a side of the outermost layer farther from the platen.

3. The system of claim 1, comprising a power source to power the plurality of lamps, and wherein power to at least some of the plurality of lamps is independently controllable.

4. The system of claim 3, wherein the plurality of lamps are arranged in a plurality of radial zones and wherein power to each radial zone is independently controllable.

5. The system of claim 1, comprising a Faraday cage enclosing the plurality of lamps.

6. The system of claim 5, wherein the Faraday cage includes a conductive mesh through which light from the plurality lamps pass to radiatively heat the platen.

7. The system of claim 6, wherein the plurality of lamps are arranged in a plurality of radial zones and the Faraday cage isolates each radial zone.

8. The system of claim 1, wherein the platen comprises a conductive plate and the system comprises a radio frequency (RF) power source to apply RF power to the conductive plate.

9. The system of claim 8, comprising a Faraday cage surrounding the plurality of lamps, the Faraday cage including a conductive mesh through which light from the plurality lamps pass to radiatively heat the plate.

10. The system of claim 8, wherein the platen is vertically movable and is supported by a piston rod, and the system comprises a linear actuator to move the platen vertically.

11. The system of claim 10, comprising an RF pin extending through the piston rod to carry power from the RF power source to the conductive plate.

12. The system of claim 11, wherein the platen comprises a dielectric layer plate positioned between the plurality of lamps and the conductive plate.

13. The system of claim 11, wherein the platen comprises a dielectric coating covering a top surface of the conductive plate.

14. The system of claim 11, wherein the platen comprises a dielectric ring laterally surrounding the conductive plate.

* * * * *